(12) United States Patent
Fuss

(10) Patent No.: US 6,692,264 B2
(45) Date of Patent: Feb. 17, 2004

(54) ELASTOMERIC CONNECTOR FOR FUEL CELL STACK CELL VOLTAGE MONITOR

(75) Inventor: Robert L. Fuss, Spencerport, NY (US)

(73) Assignee: General Motors Corporation, Detroit, MI (US)

( * ) Notice: Subject to any disclaimer, the term of this patent is extended or adjusted under 35 U.S.C. 154(b) by 42 days.

(21) Appl. No.: 10/008,420

(22) Filed: Nov. 13, 2001

(65) Prior Publication Data

US 2003/0092292 A1 May 15, 2003

(51) Int. Cl.$^7$ ............................................. H01R 12/00
(52) U.S. Cl. ...................................................... 439/66
(58) Field of Search ............................. 439/66, 67, 86, 439/91

(56) References Cited

U.S. PATENT DOCUMENTS

| | | | | |
|---|---|---|---|---|
| 4,695,258 A | * | 9/1987 | Hanson et al. | 439/67 |
| 5,037,312 A | * | 8/1991 | Casciotti et al. | 439/66 |
| 5,403,194 A | * | 4/1995 | Yamazaki | 439/66 |
| 5,624,268 A | * | 4/1997 | Maeda et al. | 439/66 |
| 5,763,113 A | * | 6/1998 | Meltser et al. | 429/13 |
| 6,183,272 B1 | * | 2/2001 | Muller et al. | 439/91 |

FOREIGN PATENT DOCUMENTS

EP    1 001 666 A2    5/2000

\* cited by examiner

*Primary Examiner*—Tulsidas Patel
(74) *Attorney, Agent, or Firm*—Karl F. Barr, Jr.; Cary W. Brooks; Linda M. Deschere (57) ABSTRACT

A connector and method for electrically connecting to a series of closely spaced edges for use in monitoring individual cells using bipolar plates of a fuel cell stack. The connector includes an elongated elastomeric strip with electrical conductivity for a first side thereof to an opposing side thereof, but not having meaningful electrical conductivity in use along its elongated length. This elongate strip is held at an angle in relation to the closely spaced edges by alignment protrusions. This enables the use of a series of connectors which nest together to contact all the closely spaced edges. A plurality of electrically conductive elements are located on a printed circuit board against the opposing side of the elongated elastomeric strip in corresponding relationship to the closely spaced edges located against the first side of the elongate elastomeric strip. Means is provided for exerting a force to push the first side of the elongated elastomeric strip against the closely spaced edges is also provided.

20 Claims, 6 Drawing Sheets

ELASTOMERIC CONNECTOR FOR FUEL CELL STACK CELL VOLTAGE MONITOR

FIELD OF THE INVENTION

The present invention relates to an electrochemical fuel cell assembly including a cell voltage monitor; and more particularly to an electrical connecting device which may be used to monitor individual cells or clusters of cells within a stack.

BACKGROUND OF THE INVENTION

Fuel cells have been used as a power source in many applications. Fuel cells have also been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a "membrane electrode assembly" (MEA) comprising a thin, proton transmissive, non-electrically conductive, solid polymer membrane-electrolyte having the anode on one of its faces and the cathode on the opposite face. The MEA is sandwiched between a pair of electrically conductive elements which (1) serve as current collectors for the anode and cathode, and (2) contain appropriate channels and/or openings therein for distribution of the fuel cell's gaseous reactants over the surfaces of the respective anode and cathode catalysts. A typical PEM fuel cell and its membrane electrode assembly (MEA) are described in U.S. Pat. Nos. 5,272,017 and 5,316,871, issued on Dec. 21, 1993 and May 31, 1994, respectively, and assigned to General Motors Corporation, assignee of the present invention, and having as inventors Swathirajan et al.

A plurality of individual cells are commonly bundled together to form a PEM fuel cell stack. The term fuel cell is typically used to refer to either a single cell or a plurality of cells (stack) depending on the context. A group of cells within the stack is referred to as a cluster. Typical arrangements of multiple cells in a stack are described in U.S. Pat. No. 5,763,113, assigned to General Motors Corporation.

In most fuel cell assemblies, current is drawn from the fuel cell stack via a pair of bus plates, one of which is positioned at each end of the fuel cell stack. The fuel cells are stacked between the bus plates, which are typically made of copper or coated copper. Very often individual cells of the stack are contacted for monitoring individual cell voltages or currents, and/or for control or charging/discharging purposes. In most cases, these electrical contacts are not intended to carry the entire stack current, but are capable of providing electrical connection to individual fuel cells or clusters within a stack.

In mass production, an electrical connecting device is needed which is easy to handle and to install, and which provides reliable electrical contact with certain components of a fuel cell stack. It may be desirable to provide, in a single device, groups of contacts that always communicate with the same type of fuel cell component within the stack, or which contact the fuel cell stack at regularly spaced intervals along the length of the stack.

One problem with monitoring individual fuel cells or clusters of cells within a stack is the difficulty of attaching an electrical connector to the electrically conductive elements. For example, for a fuel cell which is designed to generate significant power output, a large number of bipolar plates are provided which require a large number of connections. Perhaps more importantly these connectors are located in close proximity to each other, making it difficult to make electrical connections without short circuiting with adjacent bipolar plates. The stack may include cells at a spacing, for example, of ten cells per inch. Thus, there is less than about 2.5 millimeters between each bipolar plate. Consequently, making such individual connections can be a slow and tedious process.

SUMMARY OF THE INVENTION

In a first aspect of the present invention a connector for electrically connecting to a series of closely spaced edges for use in monitoring individual cells using bipolar plates of a fuel cell stack is provided. The connector includes an elongated elastomeric strip with electrical conductivity from a first side thereof to an opposing side thereof, but not having meaningful electrical conductivity in use along its elongated length. The first side of the elongated elastomeric strip is located against a plurality of closely spaced edges. The connector also includes a plurality of electrically conductive elements located against the opposing side of the elongated elastomeric strip in corresponding relationship with the plurality of closely spaced edges located against the first side of the elongated elastomeric strip. The connector also includes means for exerting a force to push the first side of the elongated elastomeric strip against the plurality of closely spaced edges to provide an electrically conductive path associated with each of the plurality of closely spaced edges which flows from the first side of the elongated elastomeric strip, through the elongated elastomeric strip to the opposing side thereof, and through the electrically conductive elements which is isolated from the electrically conductive paths of adjacent closely spaced edges.

In another aspect of the invention a connector for electrically connecting to a series of closely spaced edges for use in monitoring individual cells using bipolar plates of a fuel cell stack is provided. The connector includes an elongated elastomeric strip with electrical conductivity from a first side thereof to an opposing side thereof, but not having meaningful electrical conductivity in use along its elongated length; the first side of the elongated elastomeric strip being located against a plurality of closely spaced edges. The connector further includes a housing with an opening adapted to hold the elongated elastomeric strip. Also included is a printed circuit board having a plurality of electrically conductive elements located thereon, the printed circuit board being attached to the housing such that the electrically conductive elements are located against the opposing side of the elongated elastomeric strip in corresponding relationship with the plurality of closely spaced edges located against the first side of the elongated elastomeric strip. Additionally included is means for exerting a force to push the first side of the elongated elastomeric strip against the plurality of closely spaced edges to provide an electrically conductive path associated with each of the plurality of closely spaced edges which flows from the first side of the elongated elastomeric strip, through the elongated elastomeric strip to the opposing side thereof, and through the electrically conductive elements which is isolated from the electrically conductive paths of adjacent closely spaced edges.

In another aspect of the invention a method of providing an electrical connection to a series of closely spaced edges for use in monitoring individual cells using bipolar plates of a fuel cell stack is provided. The method includes the step of providing an elongated elastomeric strip with electrical conductivity from a first side thereof to an opposing side thereof, but not having meaningful electrical conductivity in use along its elongated length. Also included is the step of locating the first side of the elongated elastomeric strip against a plurality of closely spaced edges. Further included is the step of locating a plurality of electrically conductive elements against the opposing side of the elongated elastomeric strip in corresponding relationship with the plurality of closely spaced edges located against the first side of the elongated elastomeric strip. Additionally included is the step of exerting a force to push the first side of the elongated elastomeric strip against the plurality of closely spaced edges to provide an electrically conductive path associated with each of the plurality of closely spaced edges which flows from the first side of the elongated elastomeric strip, through the elongated elastomeric strip to the opposing side thereof, and through the electrically conductive elements which is isolated from the electrically conductive paths of adjacent closely spaced edges.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
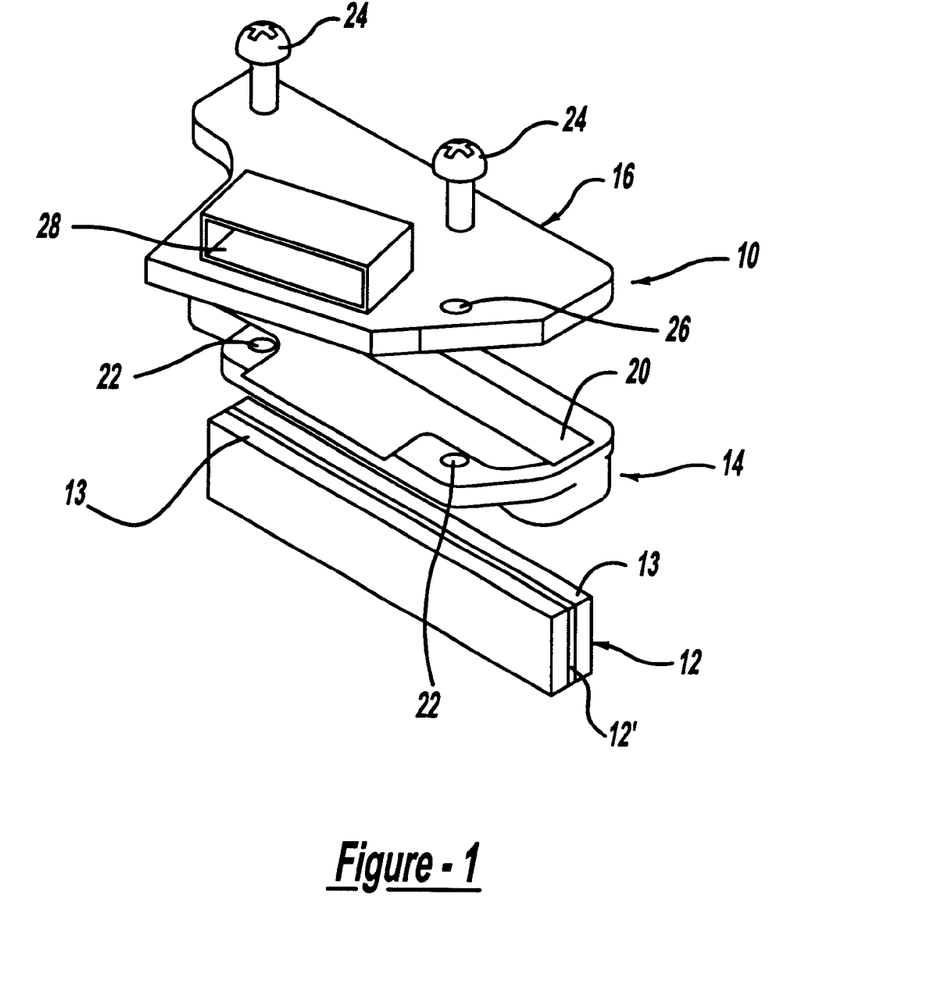
FIG. 1 is an exploded perspective view of a preferred connector assembly of the present invention.
Figure 6:
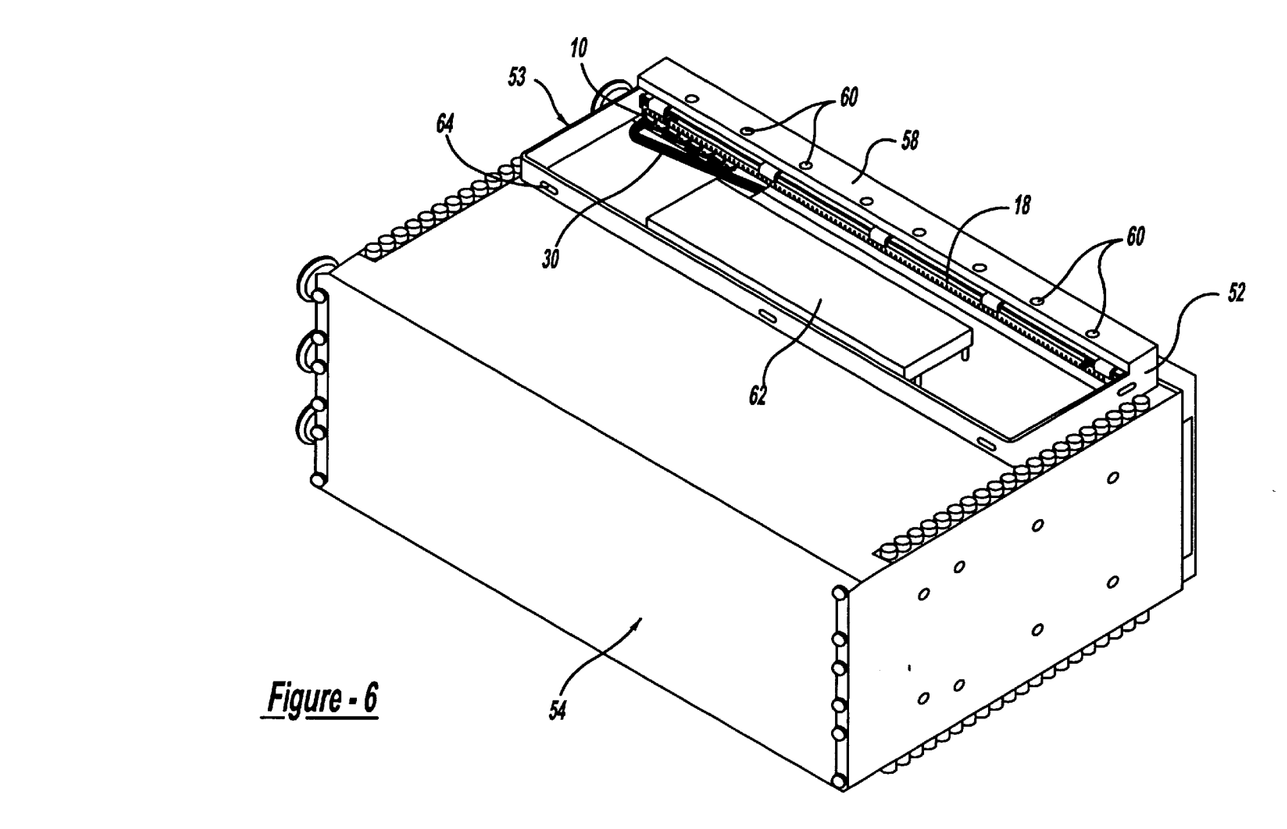
FIG. 6 is a perspective view of a fuel cell stack housing including the connector assemblies compressed in place by the compression bracket assembly and ready for enclosure within the housing.

Referring to FIG. 1, various components of a preferred connector of the present invention, indicated generally as 10, is provided. Illustrated is an elastomeric connection strip 12, a housing 14 therefor, and a printed circuit board 16. As seen in FIG. 6, and as discussed more fully hereinafter, the preferred connector 10 also generally includes a compression bracket assembly 18.

As indicated above, the components of FIG. 1 include an elastomeric connection strip 12. The strip 12 includes outer support or insulation barriers 13 which sandwich an internal electrically conductive material 12'. This internal electrically conductive material 12' is conductive through its height or thickness (or Y direction), but is not meaningfully electrically conductive in use along its elongated length (or X direction). This electrically conductive material 12' may also be conductive along its depth or width (or Z direction). Not meaningfully having electrical conductivity in use means that at the operating condition (i.e., voltage and power required to accomplish the monitoring) the current will not flow longitudinally along the elastomeric strip 12 such that there would be any unacceptable interference between adjacent electrically conductive paths through the elastomeric strip 12'; and preferably, that at the operating conditions there is no electrical current flow between adjacent electrically conductive paths.

Although this material 12' is conductive through its thickness (or Y direction) it preferably has resistance through the thickness of the electrically conductive material. The resistance protects the system if an accidental short or similar failure of the voltage monitor were to occur. More preferably, the resistance is from about 100 OHMS to about 2000 OHMS; and more preferably, from about 200 OHMS to about 1000 OHMS. Thus, the current flow is preferably from about 10 milliamps to about 0.5 milliamps; and more preferably, from about 5 milliamps to about 1 milliamp.

The selective electrical conductivity may be provided, e.g., by constructing the internally electrically conductive material 12' of alternating cross-sections of electrically conductive elastomeric material with non-conductive elastomeric cross-sections. One particularly preferred connection strip is a solid self supported connector using a carbon based elastomer sold by Fujipoly America Corporation, Carteret, N.J. 07008 under the trade name ZEBRA® Elastomeric Connectors. Of course, other elastomeric connectors may be used, including, e.g., low temperature carbon based elastomers or silver based elastomers. Although generally perpendicular cross-sections are utilized, the cross-sections may alternatively be aligned at an angle to be more closely aligned with the angle of the edge of the bipolar plates 32, when the connector 10 is in place and connected thereto.

The housing 14 holds and retains the elastomeric connection strip 12 within a retention slot 20. The housing 14 also includes appropriately sized apertures 22 for receiving self-tapping, threaded screws 24 (after passing through apertures 26 in the circuit board 16). The threaded screws 24 are used to attach the printed circuit board 16 to the housing 14. An eight pin connector 28 is provided on the circuit board 16 for attachment to an eight lead cable 30 (as seen, i.e. in FIG. 2). As seen in FIG. 3, the circuit board 16 provides electrically conductive elements 17 connecting the cable 30 to various points on the elastomeric strip 12' which oppose the edges of the bipolar plates 32 across the Y direction of the elastomeric connection strip 12.

Also as seen in FIG. 3, alignment protrusions 34 are provided on the bottom surface of the housing 14 to insure proper opposing alignment of the electrically conductive elements 17 with the edges of bipolar plates 32. Although the edges of the bipolar plates 32 are illustrated as straight edges, many modifications may be made. For example, pins of rectangular or arcuate shape, extending from the edges of the bipolar plates 32 may be provided for the elastomeric strip 12' to press against. This might enable the use of reduced compressive force against the connectors.

Figure 2:
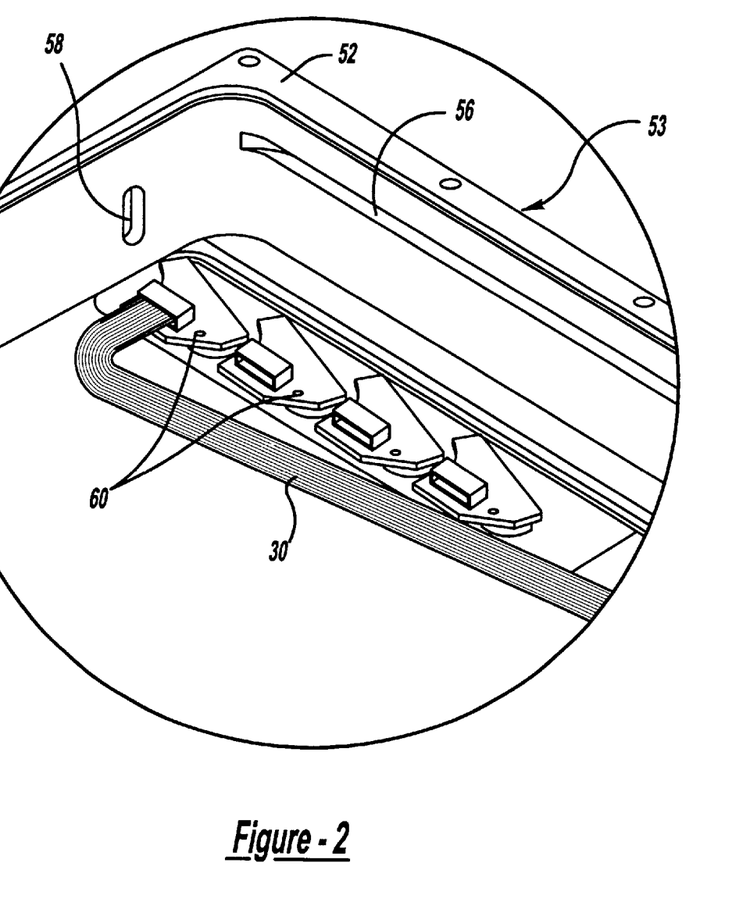
FIG. 2 is a fragmentary perspective view showing several of the preferred connector assemblies of FIG. 1 in nested position against a fuel cell.
Figure 3:
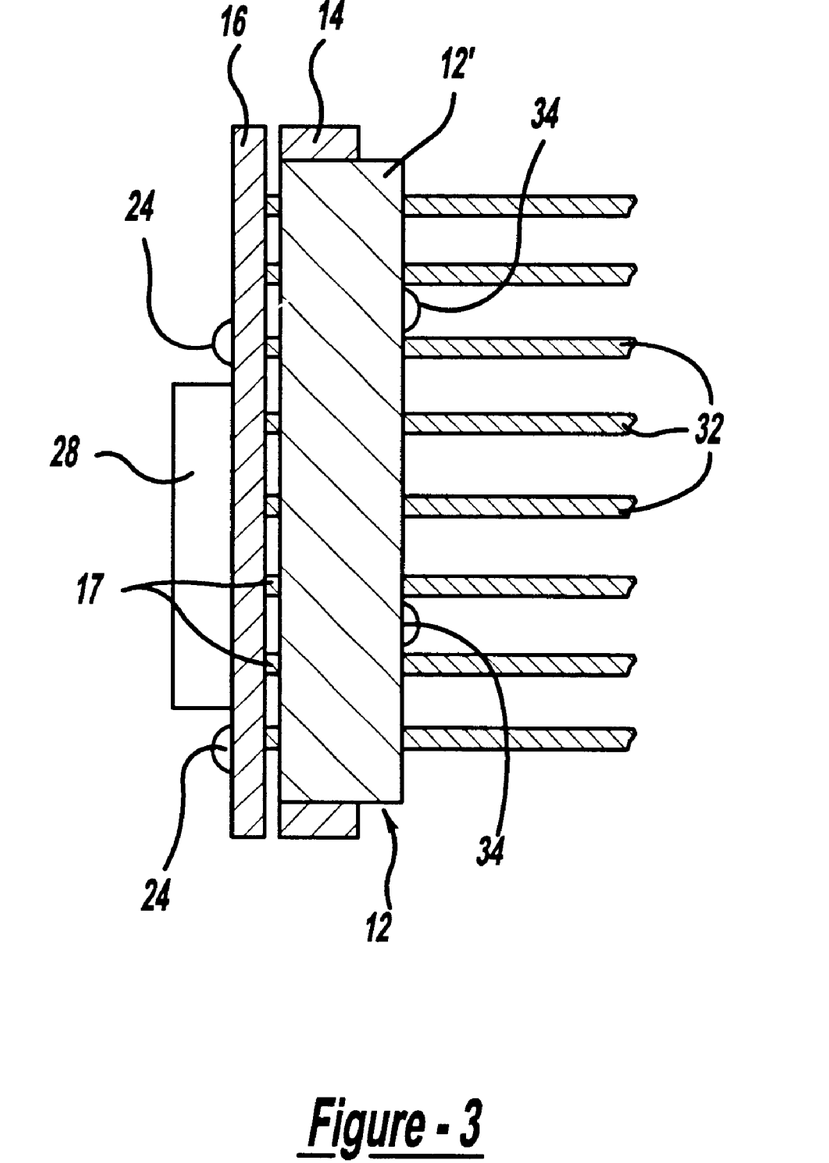
FIG. 3 is a cross-sectional view of the connector assembly adjacent the fuel cell as seen in FIG. 2.

Referring to FIG. 2, given the close proximity of the edges of the bipolar plates 32, some accommodation must generally be made to enable multiple connectors 10 to be utilized without missing contact with any of the closely spaced edges of the bipolar plates 32. This is because clearances past the ends of the elastomeric strip 12 required due to adjacent housings 14 and/or the adjacent printed circuit boards 16 are generally greater than the distance between the edges of the bipolar plates 32. The illustrated series of connectors 10 align the elastomeric strip 12 at an angle to the edges of the bipolar plates 32. Additionally, the printed circuit boards 16 and housings 14 are shaped to allow adjacent connectors 10 to nest; thereby allowing each connector 10 to occupy some space above the edge of bipolar plates 32 which are being electrically connected to by an adjacent connector 10 in the series.

Of course, many alternative constructions are possible to permit the connectors 10 to contact every edge of the bipolar plates 32 of a fuel cell stack. For example, each connector 10 could be offset from adjacent connectors 10, such that, e.g., each successive connector 10 alternates between one of two adjacent aligned rows of connectors 10. Thus, in this alternative version, the elastomeric strip 12 could be aligned perpendicular to the edges of the bipolar plate 32. As another alternative, a single part elastomeric strip 12, with a single part housing 14 might be used which extends the entire length of the fuel cell stack 54. Thus, all of the edges of the bipolar plates 32 could be contacted by a single connector 10.

Figure 4:
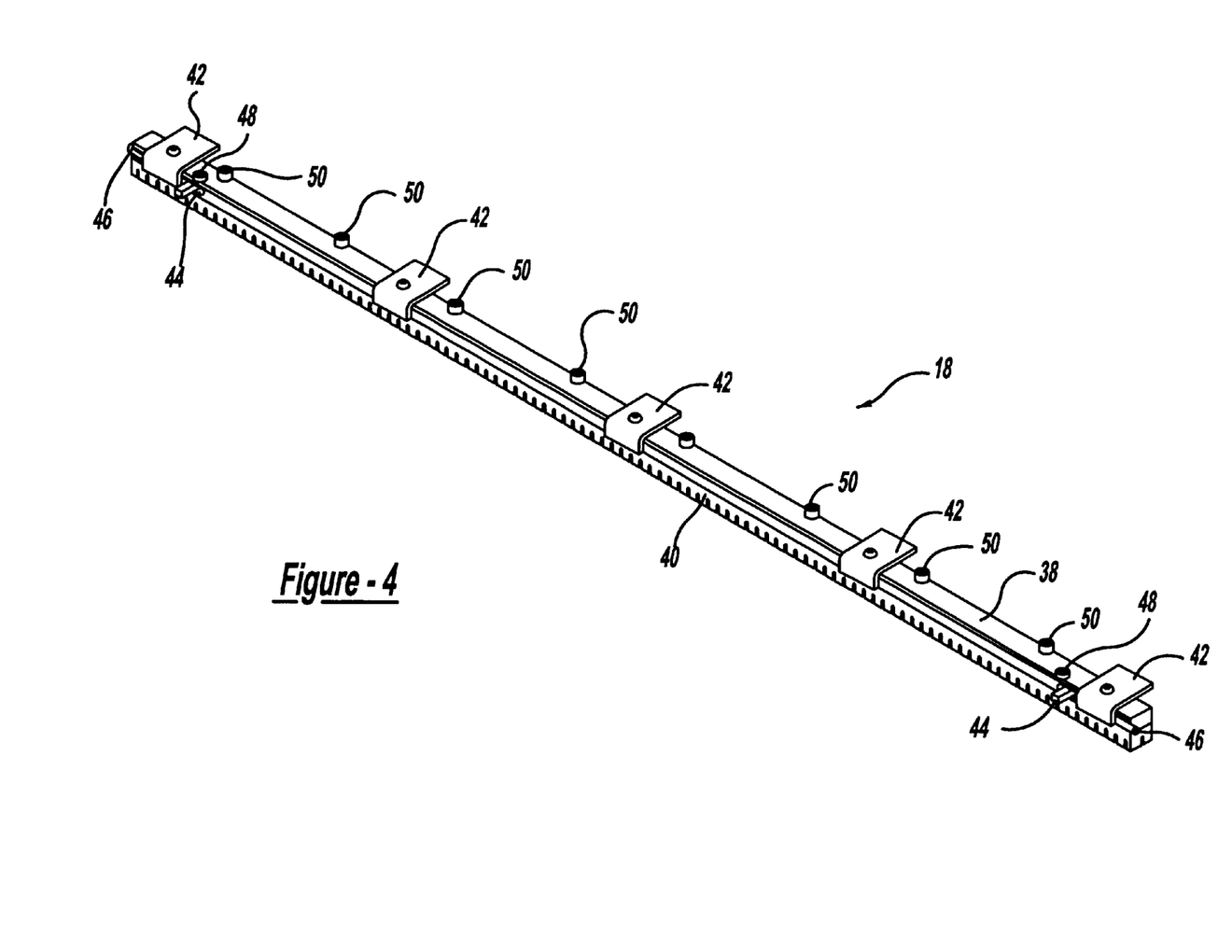
FIG. 4 is a perspective view of a compression bracket assembly for use in compressing the connector assemblies against the fuel cell.

Referring to FIG. 4, a compression bracket assembly 18 is illustrated. As discussed hereinafter, this compression bracket assembly 18 is utilized to apply a downward force on the elastomeric strip 12 to insure good electrical contact with the edges of the bipolar plates 32. The bracket assembly 18 includes an elongated metal bar 38 having a generally rectangular cross-section. An elastomeric foam material 40 is provided along one side of the bar which is segmented by grooves extending partially therethrough. Attached to the opposite side of the metal bar 38 are five clips 42. At each end of the bar 38 is a recess 44 for accommodating a slide latch 46 which is retained within the recess 44 by one of the clips 42. A locking screw 48 is also provided for locking the latch 46 in position with its distal end extended. Lastly, eight alien head screws 50 are threaded into the bar 38 at equally spaced intervals. These screws 50 are used to adjust the force or pressure exerted on the connectors 10 as discussed hereinafter.

Figure 5:
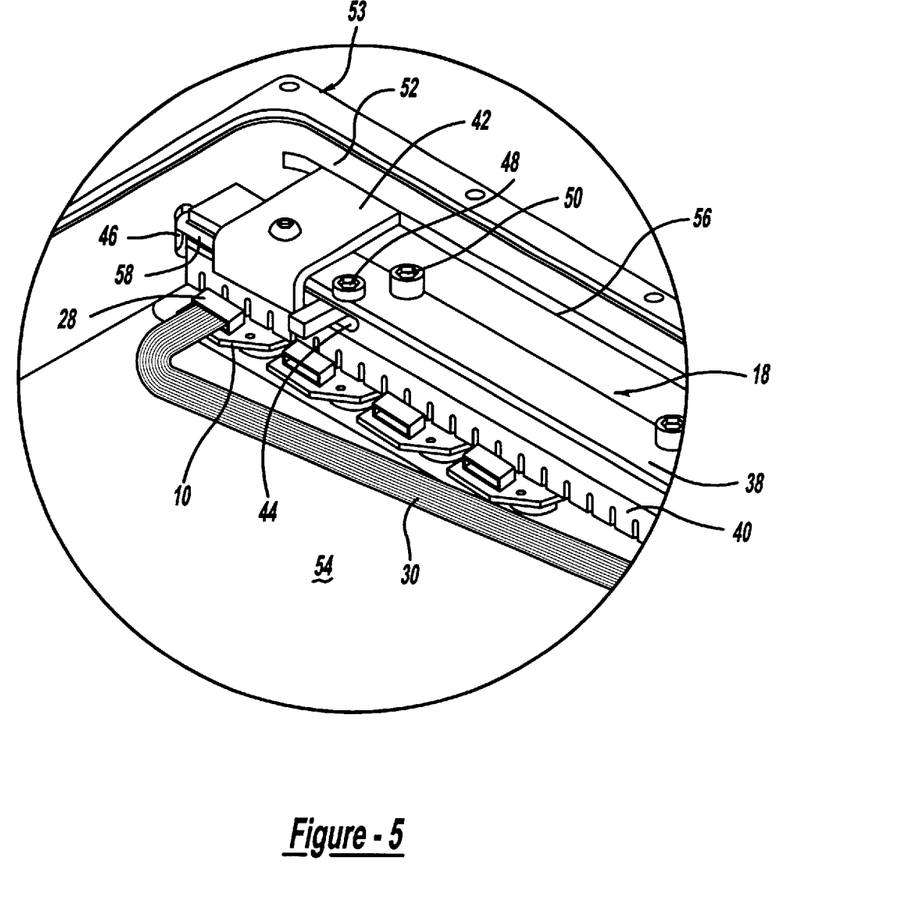
FIG. 5 is an enlarged fragmentary view similar to FIG. 2 showing the compression bracket assembly mounted over the preferred connector assemblies of FIG. 1.

Referring to FIG. 5, the compression bracket assembly 18 is attached to the cell voltage monitor housing 53 on the side of the fuel cell stack 54. The clips 42 of the compression bracket assembly 18 slide into a milled groove 56 in the peripheral wall 52 of the housing 53. The slide latch 46 is extended such that its distal end extends into slots 58 in the peripheral wall 52 and the locking screws 48 are tightened to maintain the slide latch 46 in this position. Thus, the compression bracket assembly 18 is located over the series of connectors 10 and positioned and retained such that it can provide a compression force on the connectors 10 to force the elastomeric strip 12 against the edges of the bipolar plates 32. Application of this force may also be utilized to push the opposing side of the electrically conductive elastomeric strip 12' against the electrically conductive elements 17 of the circuit board 16.

Referring to FIG. 6, an elongated rigid assembly tool 58 is temporarily attached to the housing 53. The assembly tool 58 includes apertures 60 which enable an alien wrench to pass therethrough and into each of the eight alien head screws 50 in the compression bracket assembly 18. The apertures 60 are small enough in diameter, however, that as the alien head screws 50 are backed out of the metal bar 38 of the compression bracket assembly 18, the flat surfaces of the heads of these alien head screws 50 press against the bottom surface of the assembly tool 58. Consequently, by adjusting how much each of the alien head screws 50 are backed out of the metal bar 38, the force exerted by the compression bracket assembly 18 on the connectors 10 against the edges of the bipolar plates 32 can be controlled. Once the force is appropriately adjusted the assembly tool 18 is removed and a cover (not shown) is attached to the peripheral wall 52 of the cell voltage monitoring housing 53 in sealing relationship, thereby providing the surface against which the alien head screws 50 push during use.

Prior to sealing the housing 53, however, one end of a cable 30 is connected to the eight pin connectors 28 of each electrical connector 10 and the other end is attached to a cell voltage monitor mother board (not shown) via additional connectors (not shown). The mother board may be encased within its own housing 62 and may be attached to the side of the fuel cell stack 54 within the peripheral wall 52 of the monitor housing 53. The mother board is then electrically connected through the monitor housing 53 through a sealed communication port 64. Thus, the housing 53 may be sealed from the exterior environment, if desired. Although preferably sealed from the environment, the monitor housing 53 may also include a venting means to insure a build up of gases, including hydrogen, water or air, does not occur within the monitor housing 53.

Although the use of Allen head screws pressing against the assembly tool 18 or housing cover to provide a compressive force on the elastomeric strip 12 has been discussed, many alternative mechanisms of providing this compressive force could be utilized. For example, the housing 53 could include hinged brackets with tabs that lock against a series of detents, similar to the locking structure of common plastic wire bundling strips. Alternatively, an inflatable bladder might be located between the housing 53 cover and the connectors 10. The bladder would be inflated by a gaseous or rigid material until the proper pressure is applied.

The description of the invention is merely exemplary in nature and, thus, variations that do not depart from the gist of the invention are intended to be within the scope of the invention. Such variations are not to be regarded as a departure from the spirit and scope of the invention. Accordingly, the present invention covers all modifications within the scope of the appended claims.

What is claimed is:

1. An assembly comprising a connector and a fuel cell stack having individual cells and respective bipolar plates between adjacent pairs of said cells, said connector electrically connecting a series of closely spaced edges for use in monitoring said individual cells using said bipolar plates of said fuel cell stack, the assembly comprising;

an elongated elastomeric strip comprising an electrically conductive elastomeric material, the elongated elastomeric strip having electrical conductivity from a first side thereof to an opposing side thereof, but not having meaningful electrical conductivity in use along its elongated length; the first side of the elongated elastomeric strip being located against a plurality of closely spaced edges in electrical contact with respective said bipolar plates of the fuel cell stack;

a plurality of electrically conductive elements located against the opposing side of the elongated elastomeric strip in corresponding relationship with the plurality of closely spaced edges located against the first side of the elongated elastomeric strip; and means for exerting a force to push the first side of the elongated elastomeric strip against the plurality of closely spaced edges to provide an electrically conductive path associated with each of the plurality of closely spaced edges which flows from the first side of the elongated elastomeric strip, through the elongated elastomeric strip to the opposing side thereof, and through the electrically conductive elements which is isolated from the electrically conductive paths of adjacent closely spaced edges.

2. The assembly according to claim 1, further comprising alignment protrusions associated with the elastomeric strip to align the closely spaced edges on the first side of the elongated elastomeric strip with the electrically conductive elements on the opposing side thereof.

3. The assembly according to claim 1, further comprising a housing with an opening adapted to hold the elongated elastomeric strip.

4. The assembly according to claim 1, wherein the electrical conductivity from a first side to an opposing side thereof includes electrical resistance of from about 100 OHMS to about 2000 OHMS.

5. The assembly according to claim 1, further comprising a printed circuit board upon which the electrically conductive elements are located.

6. The assembly according to claim 1, wherein the elastomeric strip includes two support or insulation barriers, one on each of two opposing lateral sides of an electrically conductive portion.

7. The assembly according to claim 1 wherein the elastomeric strip is aligned at an angle in relation to the edges of the bipolar plates.

8. The assembly according to claim 1 wherein the means for exerting a force includes an elongated bar with threaded screws for adjusting the force.

9. An assembly comprising a connector and a fuel cell stack having individual cells and respective bipolar plates between adjacent pairs of said cells, said connector electrically connecting a series of closely spaced edges for use in monitoring said individual cells using said bipolar plates of said fuel cell stack, the assembly comprising:
   an elongated elastomeric strip with electrical conductivity from a first side thereof to an opposing side thereof, but not having meaningful electrical conductivity in use along its elongated length; the first side of the elongated elastomeric strip being located against a plurality of closely spaced edges in electrical contact with respective said bipolar plates of the fuel cell stack;
   a housing with an opening adapted to hold the elongated elastomeric strip;
   a printed circuit board having a plurality of electrically conductive elements located thereon, the printed circuit board being attached to the housing such that the electrically conductive elements are located against the opposing side of the elongated elastomeric strip in corresponding relationship with the plurality of closely spaced edges located against the first side of the elongated elastomeric strip; and
   means for exerting a force to push the first side of the elongated elastomeric strip against the plurality of closely spaced edges to provide an electrically conductive path associated with each of the plurality of closely spaced edges which flows from the first side of the elongated elastomeric strip, through the elongated elastomeric strip to the opposing side thereof, and through the electrically conductive elements which is isolated from the electrically conductive paths of adjacent closely spaced edges.

10. The assembly according to claim 9, further comprising alignment protrusions associated with the elastomeric strip to align the closely spaced edges on the first side of the elongated elastomeric strip with the electrically conductive elements on the opposing side thereof.

11. The assembly according to claim 9, wherein the elastomeric strip is aligned at an angle in relation to the edges of the bipolar plates.

12. The assembly according to claim 9, wherein each housing is shaped to allow each connector to occupy some space above the edge of bipolar plates which are being electrically connected to by an adjacent connector.

13. The assembly according to claim 11, wherein the electrical conductivity from a first side to an opposing side thereof includes electrical resistance of from about 200 OHMS to about 1000 OHMS.

14. A method of providing an electrical connection in an assembly comprising a fuel cell stack having individual cells and respective bipolar plates between adjacent pairs of said cells, by providing said electrical connection to a series of closely spaced edges for use in monitoring said individual cells using said bipolar plates of said fuel cell stack, the method comprising the steps of:
   providing an elongated elastomeric strip with electrical conductivity from a first side thereof to an opposing side thereof, but not having meaningful electrical conductivity in use along its elongated length;
   locating the first side of the elongated elastomeric strip against a plurality of closely spaced edges in electrical contact with respective said bipolar plates of the fuel cell stack;
   locating a plurality of electrically conductive elements against the opposing side of the elongated elastomeric strip in corresponding relationship with the plurality of closely spaced edges located against the first side of the elongated elastomeric strip; and
   exerting a force to push the first side of the elongated elastomeric snip against the plurality of closely spaced edges to provide an electrically conductive path associated with each of the plurality of closely spaced edges which flows from the first side of the elongated elastomeric strip, through the elongated elastomeric strip to the opposing side thereof, and through the electrically conductive elements which is isolated from the electrically conductive paths of adjacent closely spaced edges.

15. A method according to claim 14, further comprising the steps of associating alignment protrusions with the elastomeric strip and utilizing the alignment protrusions to align the closely spaced edges on the first side of the elongated elastomeric strip with the electrically conductive elements on the opposing side thereof.

16. A method according to claim 14, further comprises the step of providing a housing with an opening adapted to hold the elongated elastomeric strip therein.

17. A method according to claim 14, wherein the step of providing an elongated elastomeric strip with electrical conductivity further comprises providing electrical resistance of from about 100 OHMS to about 2000 OHMS.

18. A method according to claim 14, wherein the step of locating a plurality of electrically conductive elements further comprises associating the electrically conductive elements with a printed circuit board.

19. A method according to claim 14, wherein the step of locating the first side of the elongated elastomeric strip against a plurality of closely spaced edges includes aligning the elastomeric strip at an angle in relation to the edges of the bipolar plates.

20. A method according to claim 14, wherein the step of exerting a force further comprises adjusting the force to an appropriate level.

* * * * *